(12) United States Patent
Sesko et al.

(10) Patent No.: US 8,587,772 B2
(45) Date of Patent: Nov. 19, 2013

(54) CHROMATIC POINT SENSOR CONFIGURATION INCLUDING REAL TIME SPECTRUM COMPENSATION

(75) Inventors: David William Sesko, Woodinville, WA (US); Michael Nahum, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 173 days.

(21) Appl. No.: 13/333,928

(22) Filed: Dec. 21, 2011

(65) Prior Publication Data

US 2013/0162972 A1 Jun. 27, 2013

(51) Int. Cl.
*G01C 3/08* (2006.01)

(52) U.S. Cl.
USPC ......... 356/4.05; 356/3.01; 356/3.1; 356/4.01; 356/4.1

(58) Field of Classification Search
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| | | | |
|---|---|---|---|
| 5,790,242 A | 8/1998 | Stern | |
| 5,887,009 A | 3/1999 | Mandella | |
| 6,082,067 A | 7/2000 | Bott | |
| 7,369,225 B2 | 5/2008 | Messerschmidt | |
| 7,876,456 B2 * | 1/2011 | Sesko | ............. 356/609 |
| 8,317,347 B2 * | 11/2012 | Gladnick et al. | ............. 362/84 |
| 2009/0018700 A1 | 1/2009 | Okamoto | |
| 2012/0050723 A1 * | 3/2012 | Emtman et al. | ............. 356/123 |

OTHER PUBLICATIONS

Booth, M.J., et al., "Spectral Confocal Reflection Microscopy Using a White Light Source," Journal of the European Optical Society 3(08026):1-6, 2008.
Cacace, L.A., "An Optical Distance Sensor: Tilt Robust Differential Confocal Measurement With mm Range and nm Uncertainty," doctoral dissertation, Technische Universiteit Eindhoven, Eindhoven, Netherlands, 2009, 275 pages.

* cited by examiner

*Primary Examiner* — Luke Ratcliffe
(74) *Attorney, Agent, or Firm* — Christensen O'Connor Johnson Kindness PLLC

(57) ABSTRACT

A chromatic point sensor system configured to compensate for potential errors due to workpiece material effects comprises a first confocal optical path including a longitudinally dispersive element configured to focus different wavelengths at different distances proximate to a workpiece; a second optical path configured to focus different wavelengths at substantially the same distance proximate to the workpiece; a light source connected to the first confocal optical path; a light source connected to the second optical path; a first confocal optical path disabling element; a second optical path disabling element; and a CPS electronics comprising a CPS wavelength detector which provides output spectral profile data. The output spectral profile data from the second optical path is usable to compensate output spectral profile data from the first confocal optical path for a distance-independent profile component that includes errors due to workpiece material effects.

18 Claims, 9 Drawing Sheets

CHROMATIC POINT SENSOR CONFIGURATION INCLUDING REAL TIME SPECTRUM COMPENSATION

FIELD OF THE INVENTION

The invention relates generally to precision measurement instruments, and more particularly to chromatic point sensors and similar optical distance determining devices, and their use.

BACKGROUND OF THE INVENTION

It is known to use chromatic confocal techniques in optical height or distance sensors. As described in U.S. Pat. No. 7,876,456 (the '456 patent), which is hereby incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the surface height or distance relative to the focusing element determines which wavelength is best focused. Upon reflection from the surface, the light is refocused onto a small detector aperture, such as a pinhole or the end of an optical fiber. Upon reflection from the surface and passing back through the optical system to the in/out fiber, only the wavelength that is well-focused on the surface is well-focused on the aperture. All of the other wavelengths are poorly focused on the aperture, and so will not couple much power into the fiber. Therefore, for the light returned through the fiber, the signal level will be greatest for the wavelength corresponding to the surface height or distance to the surface. A spectrometer type detector measures the signal level for each wavelength, in order to determine the surface height.

The '456 patent further describes that certain manufacturers refer to practical and compact systems that operate as described above, and which are suitable for chromatic confocal ranging in an industrial setting, as chromatic point sensors. A compact chromatically-dispersive optical assembly that is used with such systems is referred to as an "optical pen," or a "pen." The optical pen is connected through an optical fiber to an electronic portion of the chromatic point sensor which transmits light through the fiber to be output from the optical pen and which provides a spectrometer that detects and analyzes the returned light. The returned light forms a wavelength-dispersed intensity profile received by the spectrometer's detector array. Pixel data corresponding to the wavelength-dispersed intensity profile is analyzed to determine the "dominant wavelength position coordinate" as indicated by a peak or centroid of the intensity profile, and the resulting pixel coordinate of the peak or centroid is used with a lookup table to determine the distance to the surface. This pixel coordinate may be determined with sub-pixel resolution, and may be referred to as the "distance indicating coordinate."

The '456 patent further describes that, in normal operation, the CPS spectrometer ordinarily receives a certain range or peak region of wavelengths for a certain measurement distance. It is disclosed that the CPS spectrometer may distort the shape of peak region of wavelengths, and thus influence the corresponding peak or centroid and the resulting distance indicating coordinate. The systems and methods of the '456 patent provide component calibration data, also referred to as compensation data, that encompasses the effects of wavelength-dependent variations (e.g., non uniform response) in the CPS spectrometer, and/or the CPS broadband light source. The compensation data of the '456 patent is used to reduce or eliminate errors associated with these effects in the spectrometer and light source. The compensation data of the '456 patent may be redetermined and/or replaced at various points in time, such that the compensation data remains effective to reduce or eliminate errors despite changes in the spectrometer and/or light source characteristics (e.g., due to component aging, environmental variations, or the like).

Chromatic point sensors provide very high resolution and accuracy (e.g., sub-micron resolution and accuracy) based on distance calibration data that correlates known measurement distances with the resulting dominant wavelength position coordinate (the distance indicating coordinate) along the array. At the level of resolution and accuracy provided by chromatic point sensors, measurement errors may occur as a result of measurement conditions failing to precisely match the conditions present at the time of calibration, even when the methods of the '456 patent are used.

For example, one source of error in a chromatic point sensor (CPS) is workpiece-specific spectral reflectivity variations. A chromatic point sensor which provides a means for compensating for spectral reflectivity variations is disclosed in U.S. Pat. No. 5,790,242 (the '242 patent). Briefly, a confocal beam is split, and the split portions of the beam are spatially filtered at their focus with a confocal aperture and a central stop (which is "an inverse pinhole") to provide respective signals on respective energy collecting detectors. The '242 patent describes that "at an instant of time within the sweep" when the ratio between the aperture signal and the signal from the energy that passes around the central stop is at a maximum, the energy through the aperture is the result of "focus," independent of the reflectivity of the target. A calibration is provided (by unspecified means) which relates the wavelength at this instant in time to the depth of the surface. However, the accuracy of the '242 patent therefore depends on providing a "sweep," and on sensing a relationship between two signals "at an instant," and detecting a dominant wavelength in one of the signals at that instant. Such a system introduces electronic complexity and associated noise sources, and may be difficult for a user to comprehend and/or calibrate. Furthermore, such a system does not gather any data characterizing the target surface reflectivity characteristics, which may be desired as an accuracy or calibration verification, or a material verification, in various applications.

Providing improved, and/or more reliable operation for chromatic point sensors by overcoming additional sources of measurement errors that result from changing measurement conditions, and particularly from workpiece-specific spectral reflectivity variations, is desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention is aimed toward providing spectral profile data usable to compensate for material spectral reflectivity variations "on the fly" (that is, simultaneously or nearly simultaneously with corresponding CPS measurement data). The spectral profile data may also be usable to compensate for errors associated with light source variations and the like, in some embodiments. The configuration of this invention is easier to use, and may provide more accurate and robust error compensation in some applications, in comparison to the '242 patent. The disclosure of the '456 patent does not mention errors due to material spectral reflectivity variations, nor does it propose a system configuration or method that can be used to compensate for such errors.

A chromatic point sensor (CPS) system is configured to compensate for potential errors, including errors due to workpiece material effects. The CPS system comprises a first confocal optical path including a longitudinally dispersive element, the first confocal optical path configured to focus different wavelengths at different distances proximate to a workpiece; a second optical path configured to focus different wavelengths at substantially the same distance proximate to the workpiece; a light source connected to input a first input spectral profile of wavelengths to the first confocal optical path; a light source connected to input a second input spectral profile of wavelengths to the second optical path; a first confocal optical path disabling element configured to prevent the first input spectral profile from being transmitted to a workpiece through the first confocal optical path; a second optical path disabling element configured to prevent the second input spectral profile from being transmitted to a workpiece through the second optical path; and a CPS electronics comprising a CPS wavelength detector comprising a plurality of pixels distributed along a measurement axis of the CPS wavelength detector, the plurality of pixels receiving respective wavelengths and providing output of spectral profile data. The CPS system is configured such that when the first confocal path blocking element is not activated, the first input spectral profile is connected to the first confocal optical path, the first confocal optical path outputs corresponding radiation to the workpiece surface and receives first path reflected radiation from the workpiece surface, the first path reflected radiation having a first output spectral profile comprising a distance-dependent profile component having a peak that indicates a measurement distance from the first confocal optical path to the workpiece and a distance-independent profile component that includes a workpiece material component, and the CPS electronics provides corresponding first output spectral profile data. The CPS system is further configured such that when the second path blocking element is not activated, the second input spectral profile is connected to the second optical path, the second optical path outputs corresponding radiation to the workpiece surface and receives second path reflected radiation from the workpiece surface, the second path reflected radiation having a second output spectral profile comprising a distance-independent profile component (meaning a shape-determining contribution to the spectral profile) that includes the workpiece material component, and the CPS electronics provides corresponding second output spectral profile data that is usable to compensate the first output spectral profile data for potential measurement distance errors comprising errors associated with the workpiece material component. The workpiece material component may characterize errors associated with workpiece specific spectral reflectivity variations, for example, in addition to other potential errors.

In some embodiments, the first optical path and the second optical path may output the first source radiation and the second source radiation to the same portion of the workpiece.

In some embodiments, the first optical path and the second optical path may each include a shared objective lens.

In some embodiments, the CPS system may be integrated into a machine vision inspection system and the first optical path and the second optical path may each include a shared objective lens which is part of the machine vision inspection system. This may advantageously provide a means for measuring surface heights parallel to an optical axis of the machine vision inspection system with high resolution. In some embodiments, the machine vision inspection system may be configured to image the workpiece surface through the shared objective lens.

In some embodiments, the light source connected to input a first input spectral profile of wavelengths to the first confocal optical path and the light source connected to input a second input spectral profile of wavelengths to the second optical path may be the same light source. In alternative embodiments, the light source connected to input a first input spectral profile of wavelengths to the first confocal optical path and the light source connected to input a second input spectral profile of wavelengths to the second optical path may be different light sources.

In some embodiments, the first confocal optical path disabling element and the second optical path disabling element may be the same element.

In some embodiments, the first confocal optical path disabling element and the second optical path disabling element may be provided by a switching element which comprises one of (a) a shutter wheel, and (b) a fiber switcher.

In some embodiments, the CPS electronics may further comprise a control system configured to determine workpiece-specific spectral profile compensation data based on the second output spectral data and to compensate the first output spectral profile data for potential measurement distance errors comprising errors associated with the workpiece material component.

In some embodiments, the distance-independent profile component may include a light source spectrum profile component associated with the light source and the second output spectral profile may be used to compensate errors associated with the light source spectrum profile component.

In some embodiments, the different distances where the first confocal optical path focuses different wavelengths may define a measurement range and the distance where the second optical path focuses different wavelengths may be within the measurement range.

In some embodiments, the first confocal optical path and the second optical path may comprise a common path with a shared beamsplitter. In some embodiments, the first confocal optical path and the second optical path may be collinear between the shared beamsplitter and the workpiece surface. In some embodiments, one of the first confocal optical path and the second optical path may comprise a reflector.

In some embodiments, the first confocal optical path may comprise a first optical pen and the second optical path may comprise a second optical pen.

In some embodiments, the second optical path may comprise an achromat.

In various embodiments, it may be advantageous for the second optical path to be a confocal optical path.

In some embodiments, the CPS electronics may comprise a compensation portion, the second optical path may be used to acquire the second output spectral profile from a representative portion of the workpiece surface, the compensation portion may receive the second output spectral profile, the first optical path may be used to acquire the first output spectral profile from a measurement portion of the workpiece surface which is different from the representative portion and the compensation portion may be used to compensate the first output spectral profile data for potential measurement distance errors comprising errors associated with the workpiece material component.

It should be appreciated that CPS measurement profile peak region signals may extend over a range of several pixels on the wavelength detector, or several tens of pixels, more. In the absence of the compensation methods outlined above, the shape of the CPS measurement profile peak region signals generally includes some type of error or distortion due to operating variations such as: reflectivity variations, light source variations, wavelength detector variations, etc. Unless such errors or distortions are compensated, the determination of the peak location for the measurement profile peak region will be inconsistent or erroneous for different workpiece surfaces, etc. Thus, it is important in various implementations that the error compensation factors outlined above be applied to the measurement profile peak region signals prior to the determination of the sub-pixel resolution distance indicating coordinate that indicates the peak location of the measurement profile peak region signals.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
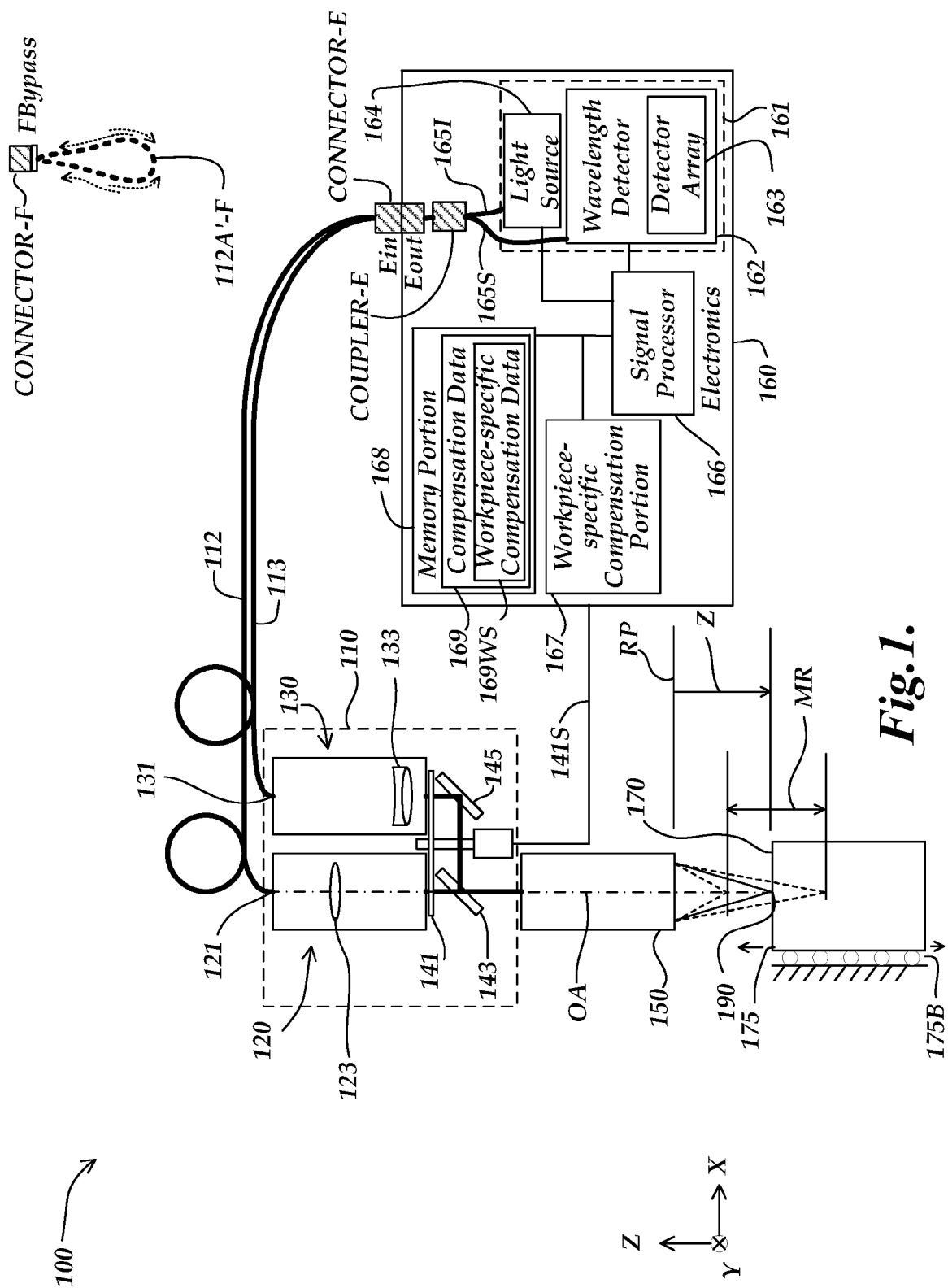
FIG. 1 is a block diagram of a first exemplary embodiment of a chromatic point sensor (CPS) system including first and second optical paths in accordance with the invention.

FIG. 1 is a block diagram of a first exemplary embodiment of a chromatic point sensor (CPS) system 100. As shown in FIG. 1, the chromatic point sensor system 100 includes a dual path optical portion 110, a switching element 141 and an electronics portion 160 which comprises a source+detector subsystem 161 and a light source 140. The dual path optical portion 110 comprises a first confocal optical path 120 and a second optical path 130. The first confocal optical path 120 comprises a chromatically dispersive optical element 123. The second optical path 130 comprises a non dispersive optical element 133. In some embodiments, the non dispersive optical element 133 may comprise an achromat.

The source+detector subsystem 161 comprises a wavelength detector 162, the CPS wavelength detector 162 comprising a plurality of pixels distributed along a measurement axis of the CPS wavelength detector 162, the plurality of pixels receiving respective wavelengths and providing output spectral profile data. The light source 164 is connected to input a first spectral profile of wavelengths to an optical fiber 112 associated with the first confocal optical path 120. The light source 164 is additionally connected to input a second spectral profile of wavelengths to an optical fiber 113 associated with the second optical path 130. In the embodiment shown in FIG. 1, the first and second optical paths are connected to the same light source 164. In alternative embodiments, each path may be connected to a difference light source, if desired.

In operation, the light source 164 outputs multiple wavelength radiation, the multiple wavelength radiation providing an input spectral profile to a connected optical path (i.e., the first confocal optical path 120 or the second optical path 130). The first confocal optical path 120 is configured to focus different wavelengths at different distances proximate to a surface location 190 of a workpiece 170, as is known for chromatic confocal sensor systems. The second optical path 130 is configured to focus different wavelengths at substantially the same distance proximate to the surface location 190 of the workpiece 170. The switching element 141 is located between the light source 164 and at least a portion of the first and second optical paths 120 and 130, such that it can selectively disable their output to the workpiece 170. In various embodiments, the switching element 141 comprises a first confocal optical path disabling element configured to prevent the first input spectral profile from being transmitted to a workpiece through the first confocal optical path 120 and a second optical path disabling element configured to prevent the second input spectral profile from being transmitted to a workpiece through the second optical path 130. In the embodiment shown in FIG. 1, the switching element 141 comprises a shutter wheel which is configured to connect the input spectral profile through the first confocal optical path 120 at a first time while blocking the input spectral profile through the second optical path 130 and to connect the input spectral profile through the second optical path 130 at a second time while blocking the input spectral profile through the first confocal optical path 120. It will be appreciated that the switching element 141 may operate as a first and/or second optical path disabling element, that is sensed and/or controlled by the CPS electronics 160 (e.g., over a power/signal line 141S) such that the appropriate signal processing is synchronized with the presence of the first and second output spectral profile.

When the first confocal path blocking element is not activated, the first input spectral profile is connected through the first confocal optical path 120. The first confocal optical path 120, including the common path shared beamsplitter 143 and the shared objective lens 150, outputs corresponding radiation to the surface location 190 of the workpiece 170 and receives first path reflected radiation from the workpiece 170. The first confocal optical path 120 focuses the first path reflected radiation to an aperture 121 which spatially filters the first path reflected radiation and outputs it to the CPS electronics 160. Due to the axial chromatic dispersion provided by the first confocal optical path 120, the first path reflected radiation has a first output spectral profile comprising a distance-dependent profile component having a peak that indicates a measurement distance Z from a reference position RP to the workpiece 170. The first output spectral profile also comprises a distance-independent profile component that includes a workpiece material component, as described in greater detail below. The CPS electronics 160 provides corresponding first output spectral profile data, including the distance-dependent profile component and the distance-independent profile component.

When the second path blocking element is not activated, the second input spectral profile (which is the same as the first input spectral profile in this embodiment) is connected through the second optical path 130. The second optical path 130, including the common path shared beamsplitter 143 and the shared objective lens 150, outputs corresponding radiation to the surface location 190 of the workpiece 170 and receives second path reflected radiation from the workpiece 170. The second optical path 130 focuses the second path reflected radiation to an aperture 131 which spatially filters the second path reflected radiation and outputs it to the CPS electronics 160. Since there is no axial chromatic dispersion provided by the second optical path 130, the second path reflected radiation has a second output spectral profile that has no distance-dependent profile component. However, the second output spectral profile does comprise a distance-independent profile component that includes a workpiece material component, as described in greater detail below. The CPS electronics 160 provides corresponding second output spectral profile data, including the distance-independent profile component. Therefore, the second output spectral profile data is usable to compensate the first output spectral profile data for potential measurement distance errors associated with at least the workpiece material component included in its distance-independent profile component, as described in greater detail below.

A primary goal of the chromatic point sensor 100 is to compensate for errors associated with workpiece-specific spectral reflectivity (which are present within the workpiece material component), in a fast and robust manner that can be implemented by a relatively unskilled user. However, it should be appreciated that the compensation of the distance-independent profile component is not limited to the component associated with workpiece specific spectral reflectivity. For example, in some embodiments, the distance-independent profile component includes a light source spectrum profile component associated with the light source 140 and/or a component associated with the wavelength detector 162, and the second output spectral profile may be used to compensate these errors as well, if the light source and/or wavelength detector is shared by the first and second optical paths.

In the embodiment shown in FIG. 1, the electronics portion 160 includes a signal processor 166, a memory portion 168 and the source+detector subsystem 161 comprising the wavelength detector 162, and a broadband light source 164 (also referred to as a white light source). In various embodiments, the wavelength detector 162 includes a detector array 163 of a spectrometer. The wavelength detector 162 may also include related signal processing (e.g., provided by the signal processor 166, in some embodiments) that removes or compensates for certain error components from the profile data that is provided by the detector array 163, by using compensation data 169 that may be stored in memory portion 168. In various embodiments disclosed herein, the compensation data 169 comprises workpiece specific compensation data 169WS, which is based on the second output spectral profile. The electronics portion 160 is coupled to the first confocal optical path 120 and the second optical path 130 through an optical path including a fiber optic cable 112 and a fiber optic cable 113, respectively, which are joined by a 2×1 connector CONNECT-E to a 1×2 coupler COUPLER-E. In some embodiments, the signal processor 166 determines workpiece-specific spectral profile compensation data 169WS based on the second output spectral data to compensate the first output spectral profile data for potential measurement distance errors comprising errors associated with the workpiece material component, according to methods outlined in later figures. Thus, certain aspects of the wavelength detector 162 and the signal processor 166 may be merged and/or indistinguishable in some embodiments. The broadband light source 164, which is controlled by the signal processor 166, is coupled through the illumination fiber segment 165I to the 2×1 coupler COUPLER-E, and the wavelength detector 162 is coupled through the illumination fiber segment 165I to the 2×1 coupler COUPLER-E.

The reflected wavelength-dependent light intensity corresponding to the first or second output spectral profile data passes back through the fiber optic path to the electronics portion 160 and the coupler COUPLER-E so that approximately 50% of the light is directed through the signal fiber segment 165S to the wavelength detector 162. The wavelength detector 162 receives the wavelength-dependent light intensity corresponding to the first or second output spectral profile data, converts it to a spectral intensity profile distributed over an array of pixels along a measuring axis of the detector array 163, and operates to provide corresponding profile data based on pixel data output from the detector array 163. After compensation is applied for the distance-independent profile component, including the workpiece material component, the subpixel-resolution distance indicating coordinate (DIC) of the first output spectral profile data is calculated by the signal processor 166 and the DIC determines the measurement distance Z to the surface location 190 via a distance calibration lookup table or the like, which is stored in the memory portion 168, as will be described in more detail below with respect to FIG. 4. The distance indicating coordinate may be determined by various methods described further below (e.g., by determining the centroid of profile data included in a peak region of the profile data). When the distance indicating coordinate is determined during calibration operations, it may be referred to as a calibration distance indicating coordinate, and when it is determined during workpiece surface measurement operations, it may be referred to as a measurement distance indicating coordinate.

In the embodiment shown in FIG. 1, the CPS electronics comprises a workpiece specific compensation portion 167, the second optical path 130 is used to acquire the second output spectral profile from a representative portion of the workpiece 170, the compensation portion 167 receives the second output spectral profile and determines workpiece-specific compensation data (e.g., as stored in the workpiece specific compensation data memory portion 169WS). The first optical path is used to acquire the first output spectral profile from a measurement portion of the workpiece surface (which may be different from the representative portion, if the workpiece is moved after acquiring the second output spectral profile from a portion of the workpiece 170) and the compensation portion 167 compensates the first output spectral profile data for potential errors, comprising errors associated with the workpiece material component. In the embodiment shown in FIG. 1, the first confocal optical path 120 and the second optical path 130 output the first source radiation and the second source radiation to the same portion of the workpiece 170 such that the representative portion and the measurement portion are the same, if the workpiece is not moved.

However, it should be appreciated that this is preferred and not limiting. For example, in alternative embodiments, the first confocal optical path 120 and the second optical path 130 may output the first source radiation and the second source radiation to different portions of the workpiece 170 that are made of a similar material which may be expected to exhibit similar reflectivity characteristics. In one such embodiment, the first confocal optical path 120 and the second optical path 130 may comprise separate first and second objective lenses with adjacent fields of view on the workpiece.

Figure 9:
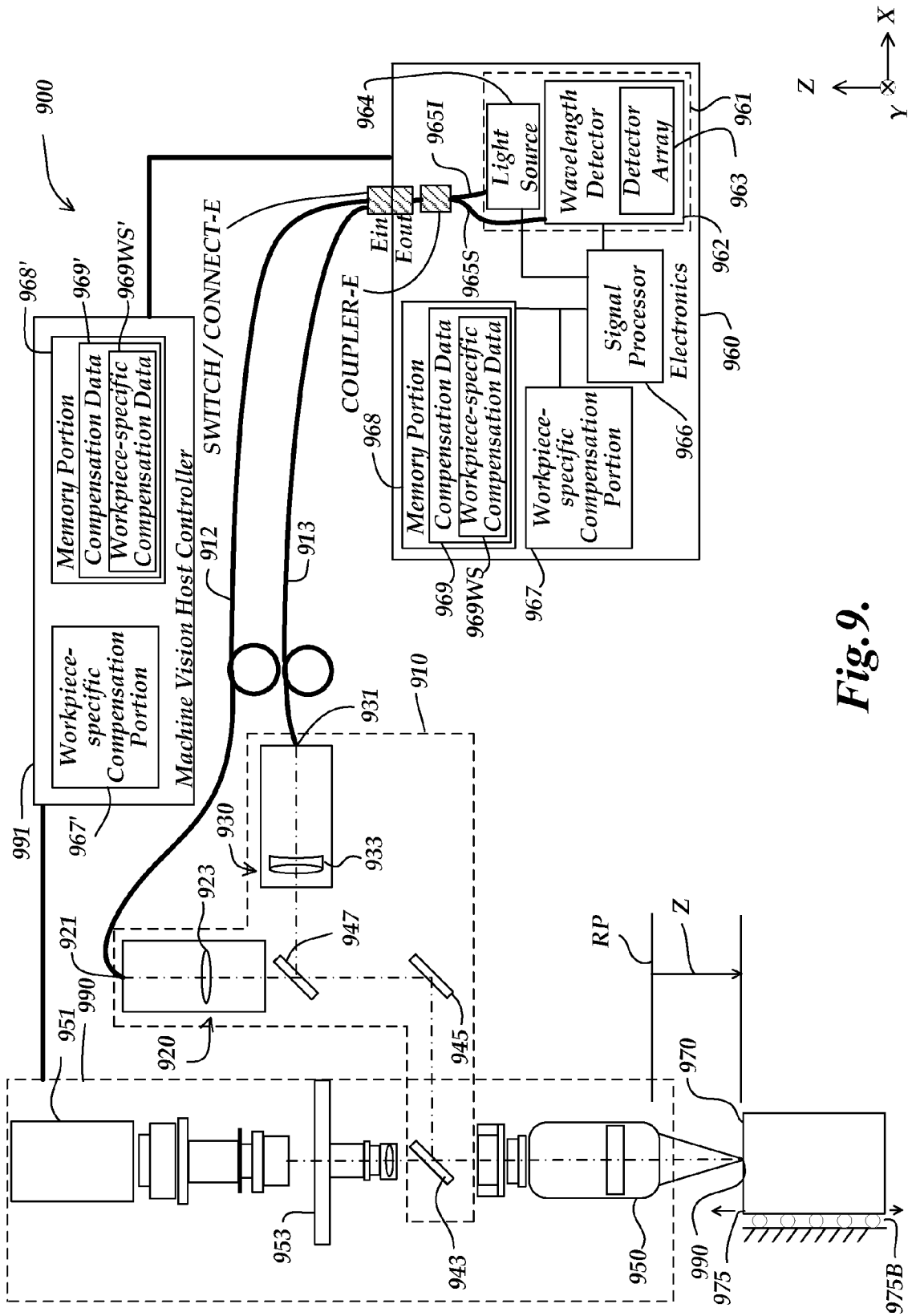
FIG. 9 is a block diagram of a third exemplary embodiment of a chromatic point sensor (CPS) system including first and second optical paths in accordance with the invention.

It should be appreciated that the embodiment shown in FIG. 1 is particularly suitable for a CPS system which is integrated into a machine vision inspection system in which the first confocal optical path 120 and the second optical path 130 each include a shared objective lens which is part of the machine vision inspection system. In such a CPS system, the machine vision inspection system may be configured to image the workpiece surface through the shared objective lens. One embodiment of such a system is shown in FIG. 9 and described in greater detail below.

In various embodiments, the different distances where the first confocal optical path 120 focuses different wavelengths define a measurement range MR and the distance where the second optical path 130 focuses its different wavelengths (all of its wavelengths) is within the measurement range.

In the embodiment shown in FIG. 1, the first confocal optical path 120 and the second optical path 130 comprise a common path shared beamsplitter 143. The first confocal optical path 120 and the second optical path 130 are collinear between the shared beamsplitter 143 and the workpiece 170. The second optical path 130 comprises a reflector 145. It should be appreciated that this arrangement is exemplary and not limiting. Effective variations may be understood by a person of ordinary skill in the art.

FIG. 1 includes orthogonal XYZ coordinate axes, as a frame of reference. The Z direction is defined to be parallel to an optical axis, or distance-measuring axis, of the first confocal optical path 120. As illustrated in FIG. 1, during operation, the workpiece 170 is placed along an optical axis of the first confocal optical path 120. In one embodiment, the workpiece 170 is aligned and mounted on a translation stage 175 which may be advantageously aligned such that it translates along the X axis direction constrained by guide bearings 175B, with its surface 175A nominally parallel to the XY plane. Other exemplary features and operations of the chromatic point sensor 100 will be described in more detail below.

FIG. 1 additionally shows a bypass optical path 112A'-F which may be attached to the source+detector subsystem 161 via the connector CONNECTOR-F, according to teachings disclosed in the '456 patent. The bypass optical path 112A'-F comprises an optical fiber loop mounted to the connector portion FBypass, such that bypass light transmitted along the optical path from the light source 164 circulates around the optical fiber loop 112A'-F and back into the optical path and is returned to the wavelength detector 162, where it forms a raw intensity profile which may be used for calibration operations, as described in the '456 patent, and/or below with reference to FIG. 5 and FIG. 6.

Figure 2:
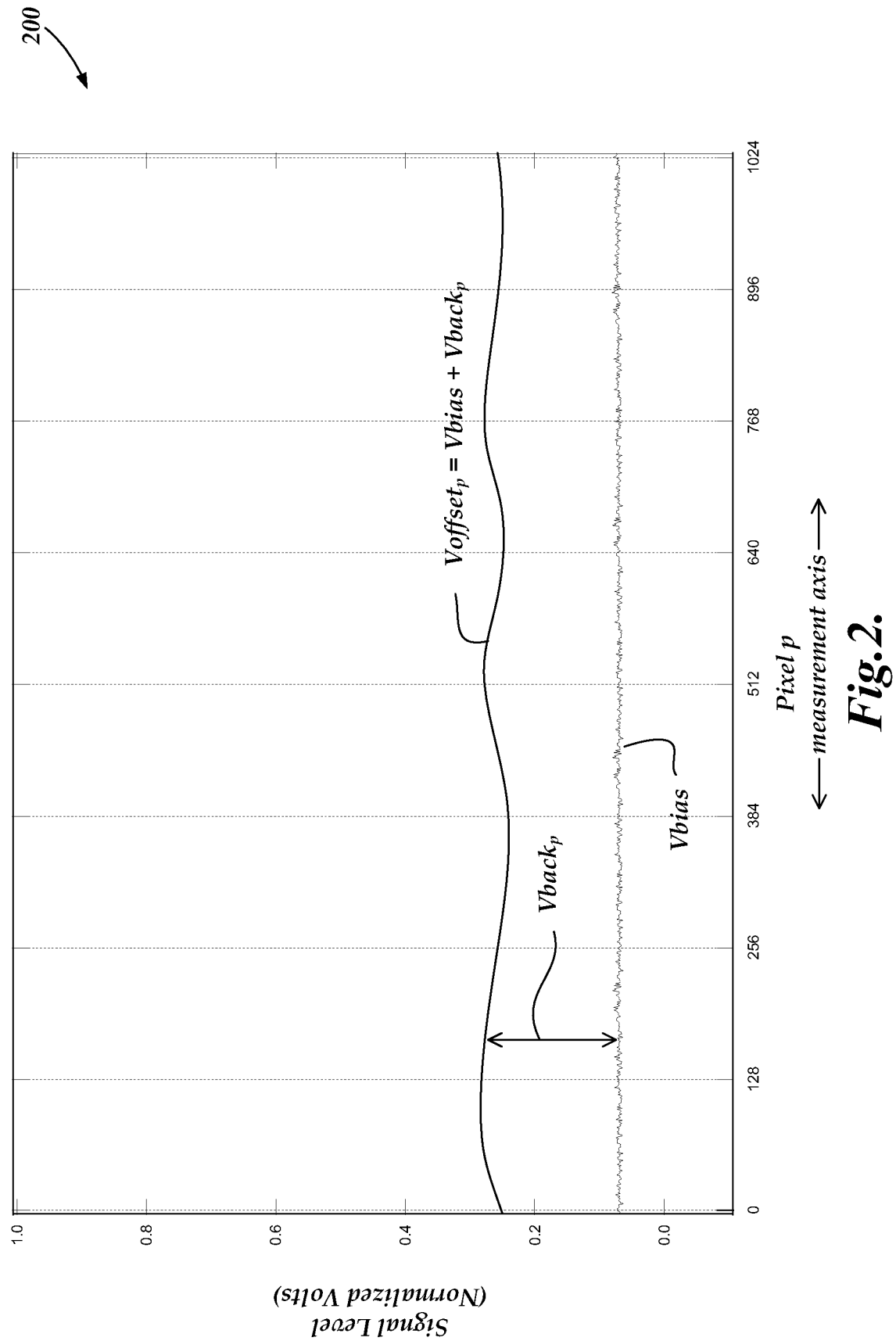
FIG. 2 is a diagram of profile data from a chromatic point sensor illustrating voltage offset signal levels for the pixels in a detector array.

The following description of FIG. 2 outlines certain known background signal processing and/or calibration operations that may be used in combination with this invention, in various embodiments. The purpose of this description is to emphasize that the inventive methods disclosed further below are distinct from, but compatible with, these operations.

FIG. 2 is a diagram 200 of profile data from a chromatic point sensor illustrating voltage offset signal levels Voffset(p) for the pixels in a detector array 163 when no measurement surface is present (e.g., the surface location 190 of the workpiece 170 of FIG. 1 is not present), such that there is no intentionally reflected light and no significant dominant wavelength peak in the resulting intensity profile. As shown in FIG. 2, the voltage offset signal Voffset(p) is plotted in normalized volts, for each of 1,024 pixels. "Normalized volts" assigns a value of 1.0 to the saturation voltage of the detector array 163. The voltage offset signal Voffset(p) includes a bias signal level Vbias, which is shown as unvarying across the array, and a background signal component Vback(p), which is shown as being dependent upon the pixel coordinate p across the array. The variable background signal Vback(p) represents signals such as background light from wavelength-dependent spurious reflections and the like in the chromatic point sensor, as well as due to the dark current of the various pixels p. In various embodiments, it is advantageous if the signal components Vback(p) (or signals that show the same variation, such as the voltage offset signals Voffset(p)) are stored for calibration or compensation of the pixel array of the detector array 163, and used to compensate all subsequent profile data signals from each pixel p (e.g., by subtraction), on an ongoing basis. Thus, it will be understood that the background signal component Vback(p) is assumed to be compensated in a known manner in various embodiments according to this invention, and it is not necessary that it be further explicitly considered or described in relation to the various intensity profiles or inventive signal processing operations, or the like, described below.

In contrast to the background signal component Vback(p), which may be relatively stable over time, the coordinate-independent bias signal level Vbias may change as a result of voltage drifts associated with ambient temperature changes and heat generated by the electronics portion 160 during operation.

Figure 3:
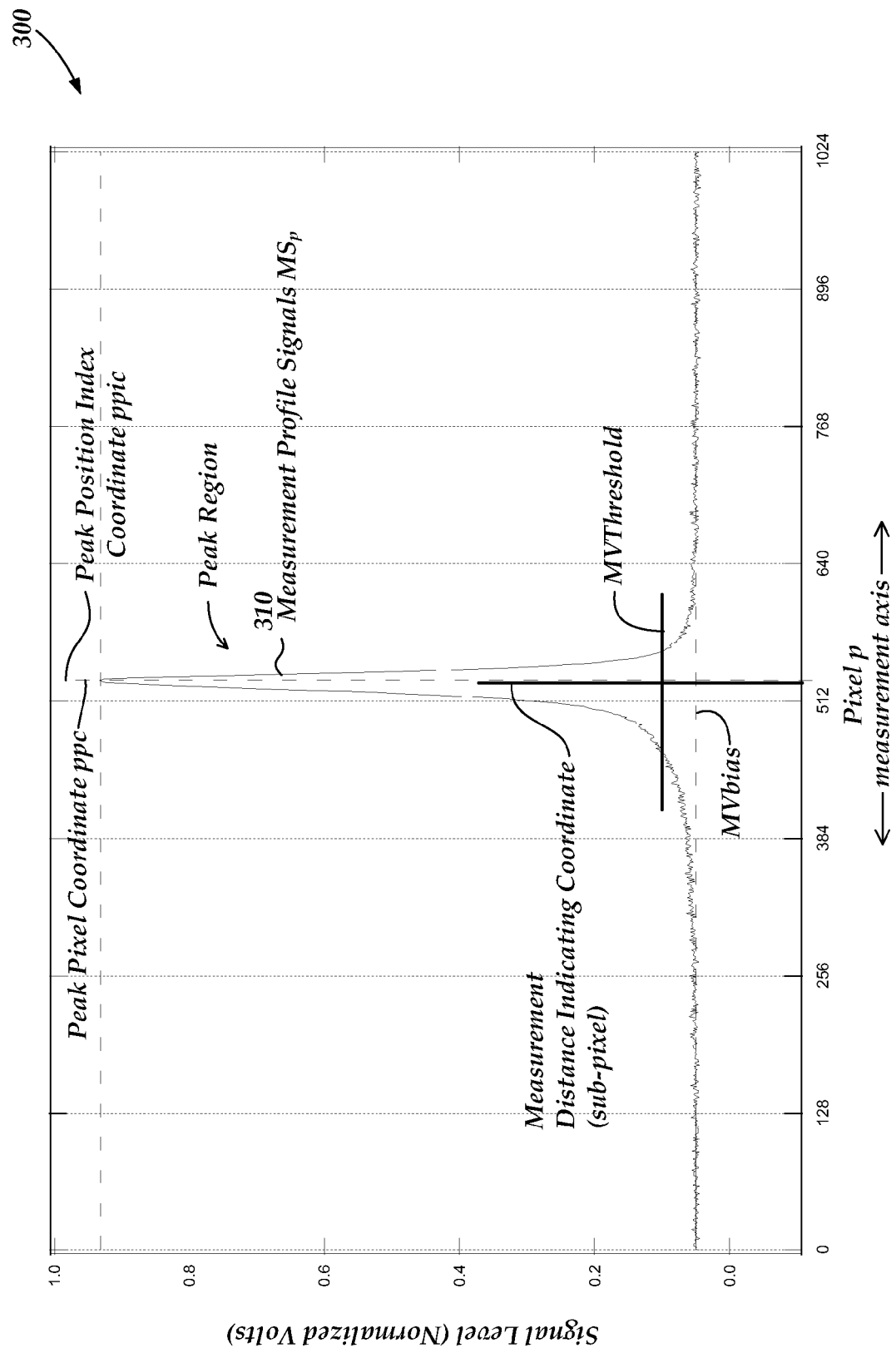
FIG. 3 is a diagram of profile data from a chromatic point sensor illustrating a peak region signal corresponding to a measurement distance indicating coordinate.
Figure 4:
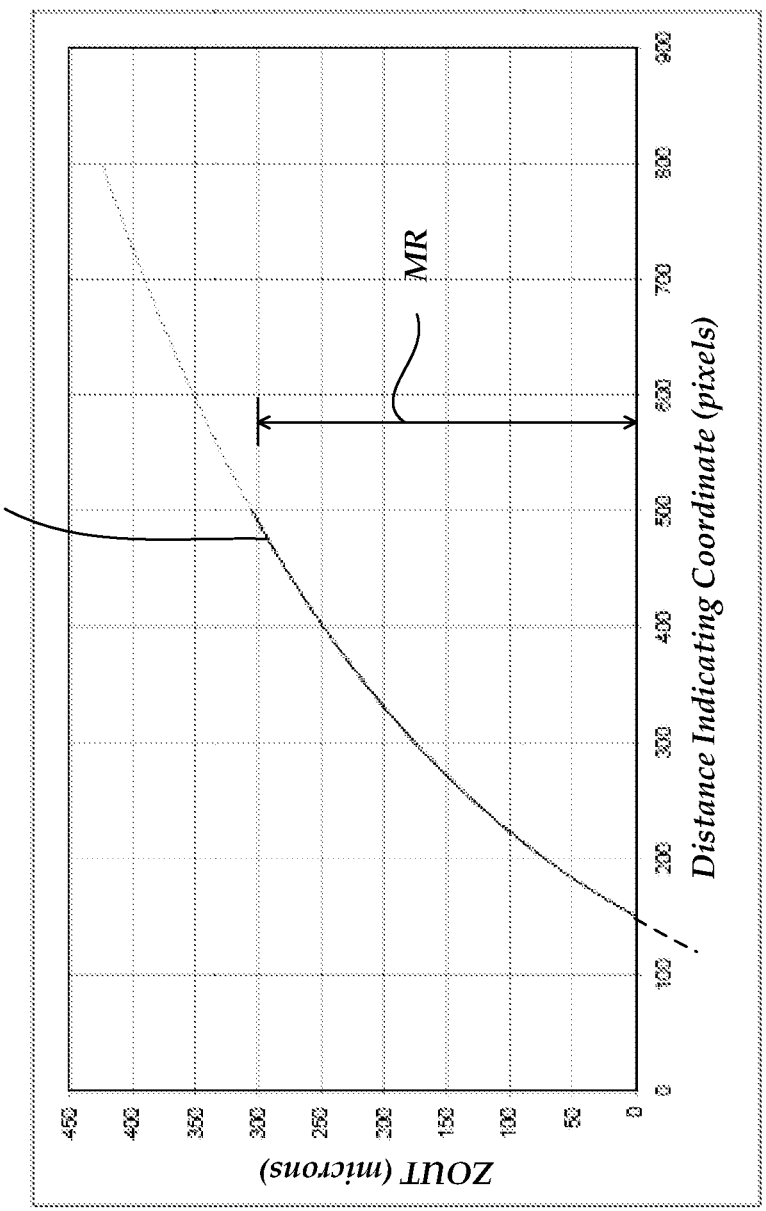
FIG. 4 is a diagram of chromatic point sensor distance calibration data which correlates known measurement distances with distance indicating coordinates for a chromatic point sensor.

The following description of FIGS. 3 and 4 outlines certain signal processing operations that determine distance indicating coordinates based on a distance-indicating subset of the profile data that is dynamically adapted to compensate for changes in the contemporaneous bias signal level Vbias, resulting in more repeatable distance measurements. The operations outlined here are described in more detail in the '456 patent. The purpose of this description is to provide background information which is useful for an overall understanding of chromatic point sensor distance measurement operations, and to emphasize that the inventive methods disclosed further below are distinct from, but compatible with, these operations.

FIG. 3 is a diagram 300 of profile data 310 (measurement profile signal data) from a CPS detector (e.g., detector 162), as acquired during CPS measurement operations, either during certain optical path or overall system calibration operations or during regular measurement operation. The profile data 310 may also be referred to as the profile signals MS(p), where MS(p) is the signal level (shown in normalized volts) associated with each pixel p of a detector array (e.g., the detector array 163). The graph 300 of FIG. 3 is created with a target surface positioned at some distance along the optical axis OA of the first confocal optical path 120, producing the corresponding measurement profile data 310 having the dominant wavelength peak region shown in FIG. 3.

FIG. 3 shows a bias signal level MVbias (in normalized volts), a peak pixel coordinate ppc, a peak position index coordinate ppic, and a data threshold MVthreshold that defines the lower limit of a distance-indicating subset of the data in the peak region. All "MV" values are in normalized volts. FIG. 3 also shows a distance indicating coordinate (DIC) that is determined based on the distance-indicating subset of the data in the calibration spectral peak region. As described in the '214 application, MVthreshhold may be an index-specific threshold, MVthreshhold(ppic), in some embodiments.

Briefly, in one embodiment, measurement operations for determining a distance indicating coordinate (e.g., a distance indicating coordinate DIC, as described relative to the profile data 310), may include the following:

Position the target surface along the optical axis OA of the objective lens, and capture the resulting profile data 310.

Determine the peak pixel coordinate (that is, the pixel having the highest signal).

Determine the peak position index coordinate ppic, which is the index for storing and retrieving certain calibration data (e.g., index-specific threshold calibration data). This may be the same as the peak pixel coordinate in some embodiments.

Determine the measurement bias signal level MVbias.

Determine the data threshold MVthreshhold (e.g., as a percentage of the peak height, or based on index-specific threshold calibration data that corresponds to the current peak position index coordinate ppic).

Determine the distance indicating coordinate DIC with sub-pixel resolution, based on the distance-indicating subset of the data that has a value greater than MVthreshhold in the measurement peak region.

For a distance calibration measurement, independently determine the corresponding distance to the target surface with a desired accuracy (e.g., by interferometer), and determine a distance calibration data point in a distance calibration table or curve (e.g., a distance calibration table or curve such as that represented by the distance calibration data 410, shown in FIG. 4).

For a normal workpiece distance measurement, determine the measurement distance by correlating the measurement DIC with a corresponding distance in the stored distance calibration data (e.g., a distance calibration table or curve such as that represented by the distance calibration data 410, shown in FIG. 4).

In the foregoing operations, the distance indicating coordinate DIC may be determined with sub-pixel resolution, based on the distance-indicating subset of data above MVthreshhold. A measurement DIC may be determined according to one of a number of different methods. In one embodiment, a measurement DIC may be determined as the subpixel-resolution coordinate of a centroid $X_C$ of the distance-indicating subset of data. For example, for a detector with 1024 pixels, the centroid $X_C$ may be determined according to:

$$X_C = \frac{\sum_{p=1}^{1024} p(S_M(p))^n}{\sum_{p=1}^{1024} (S_M(p))^n} \text{ where,} \quad \text{(Eq. 1)}$$

$$S_M(p) = \begin{cases} MS_p - MVThreshold(ppic), & \text{for } MS_p \geq MVThreshold(ppic) \\ 0, & \text{for } MS_p < MVThreshold(ppic) \end{cases} \quad \text{(Eq. 2)}$$

In one specific example, n=2, in EQUATION 1. It will be appreciated that EQUATION 2 restricts the data used in the centroid calculation to a distance-indicating subset of data. When the distance indicating coordinate DIC is determined during calibration operations, it may be referred to as a calibration distance indicating coordinate, as well as a measurement distance indicating coordinate.

FIG. 4 is a diagram 400 of CPS measurement distance calibration data 410 which correlates known or calibrated measurement distances ZOUT (in microns) along the vertical axis with distance indicating coordinates (in units of pixels) along the horizontal axis, for the chromatic point sensor 100, or the like. The example shown in FIG. 4 is for a first confocal optical path 120 having a specified measurement range MR of 300 microns, which corresponds to calibration distance indicating coordinates in the range of approximately 150-490 pixels. However, the chromatic point sensor 100 may be calibrated over a larger pixel range of the detector array 163, if desired. The reference or "zero" ZOUT distance is somewhat arbitrary, and may be set at a desired reference distance relative to the first confocal optical path 120. Although the distance calibration data 410 appears to form a smooth curve, it should be appreciated that the distance calibration 410 for a typical prior art CPS system, particularly for economical CPS systems, may exhibit short range errors or irregularities.

In some embodiments, the CPS measurement distance calibration data 410 may be determined and/or used as outlined above with reference to FIG. 3. One exemplary laboratory calibration method is briefly outlined here, to further clarify the nature of the CPS distance calibration data 410. Briefly, a minor may provide a calibration surface (e.g., substituting for the surface 190 of FIG. 1) along the optical axis of the first confocal optical path 120. The displacement of the minor may be controlled in approximately 0.1 or 0.2 micron steps. For each step, the actual minor position or displacement is acquired using a reference standard, such as an interferometer. For each actual minor position, the corresponding calibration distance indicating coordinate (DIC) of the chromatic point sensor is determined, based on the corresponding intensity profile data provided by the CPS detector (e.g., as outlined previously). The calibration distance indicating coordinate and the corresponding actual position are then recorded to provide the calibration data 410.

Later, during measurement operations, to provide a distance measurement for a workpiece surface (e.g., surface 190 of FIG. 1), the workpiece surface is positioned along an optical axis of the first confocal optical path 120. The measurement distance indicating coordinate of the chromatic point sensor is determined, based on the measurement distance indicating coordinate determined from the intensity profile data provided by the CPS detector. Then, the distance calibration data 410 is used to determine the CPS measurement distance ZOUT that corresponds to that specific measurement distance indicating coordinate.

As disclosed in the '456 patent, in the absence of the compensation methods taught in the '456 patent, the shape of the CPS measurement profile peak region signals generally includes some type of distortion that is unique to specific to a light source, or wavelength detector, or both (the source+ detector subsystem), as explained in greater detail below. Unless this unique shape distortion is compensated, the determination of the peak location for the profile peak region will be inconsistent or erroneous for different CPS systems, and/or potentially for various measurement distances within a particular CPS system. The '456 patent teaches that distortion-removing error compensation factors for the source+ detector subsystem may be applied to measurement profile peak region signals prior to the determination of the sub-pixel resolution distance indicating coordinate that indicates the peak location of the measurement profile peak region signals. The '456 patent also teaches that in various embodiments, the CPS distance indicating coordinates used in the CPS distance calibration data may be based on error-compensated measurement profile signal data that is error-compensated for effects of the source+detector subsystem. For example, as taught in the '456 patent, the system used for calibration may provide error-compensated measurement profile signal data based on source+detector error compensation factors determined relative to a standardized or reference set of profile signal data. When using the same optical pen at a later time, and/or with a different source+detector subsystem, the source+detector subsystem may provide error-compensated measurement profile signal data based on error compensation factors determined for that source+detector subsystem relative to the same standardized or reference set of profile signal data, such that the CPS distance calibration data is valid for that source+detector subsystem.

Figure 5:
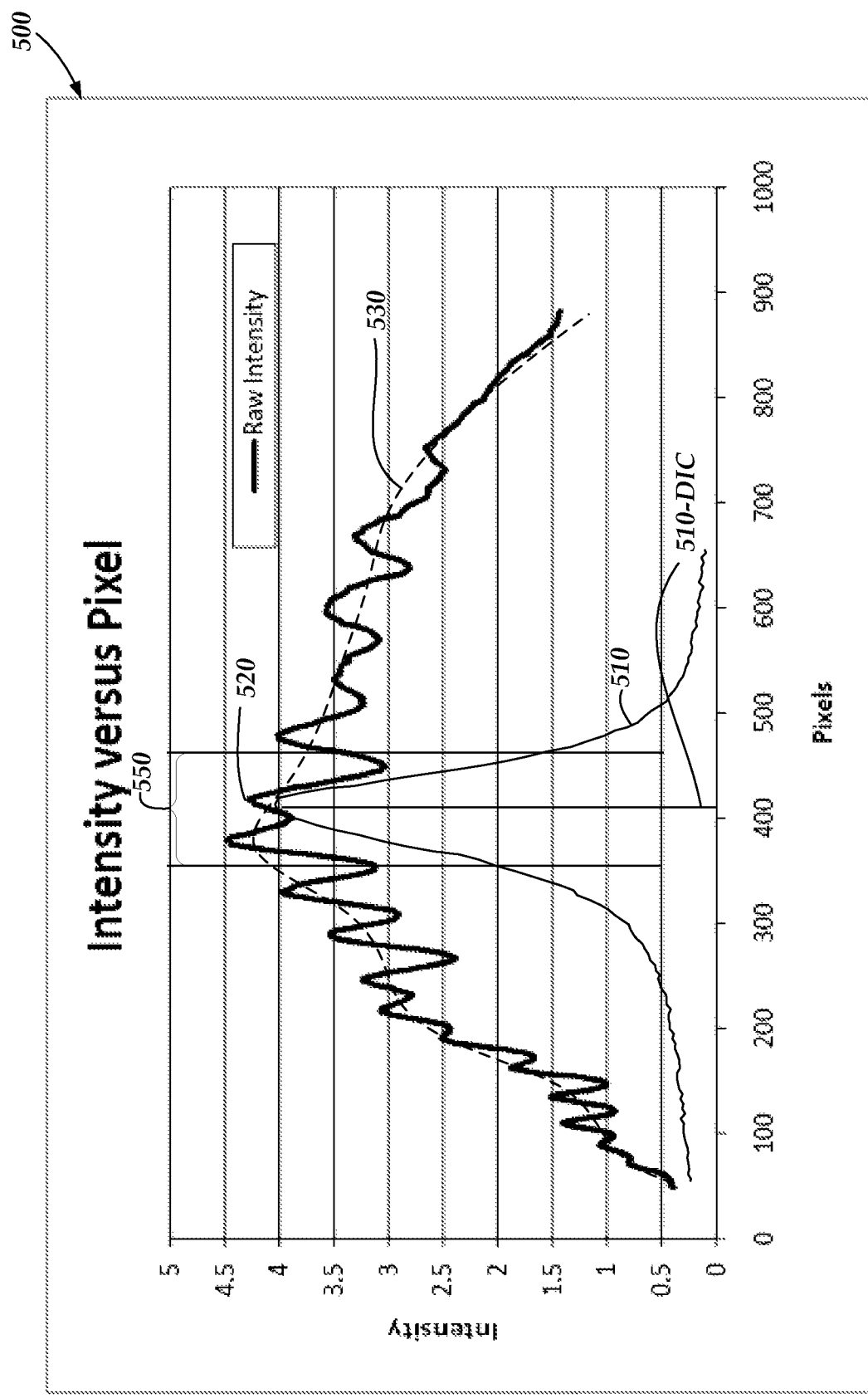
FIG. 5 is a diagram of a graph illustrating a raw intensity profile signal for a CPS source+detector subsystem, as well as a signal component attributed to a CPS light source and representative ideal peak region signal corresponding to a measurement distance indicating coordinate.

FIG. 5 and FIG. 6 help to illustrate a type of source+detector subsystem compensation taught in the '456 patent. The points outlined below are similar to points described in relation to similar figures in the '456 patent, which may supplement the understanding provided below. In the following equations, unless otherwise indicated by explanation or context, "Z" refers to an actual measurement distance to a workpiece surface. "ZOUT" refers to the distance measurement output by the CPS based on a determined distance indicating coordinate DIC, which in turn depends on the corresponding profile signals $MS_p$, as previously described with respect to FIGS. 3 and 4. It will be appreciated that for each measurement distance Z the CPS will actually produce a unique set of these signals, which depend on Z. Therefore, we refer to each such set of profile signals as MSp(Z), which produces a corresponding distance indicating coordinate DIC (Z) (e.g., determined according to EQUATIONS 1 and 2), which produces a corresponding CPS measurement output ZOUT(Z). Using these conventions, the previous explanation indicates that the DIC(Z) that is associated with a distance Z depends on the overall shape or profile of the peak region of the corresponding measurement profile data MSp(Z). We also introduce here $MS_p$ superscripts that will be used further below, the superscripts RAW (meaning not compensated for by the current measurement conditions), COMP (meaning compensated), REF (meaning a reference or calibration condition), and PEN (meaning as produced by an optical pen or the first confocal optical path 120 based on a designated or standardized source intensity spectrum).

Using these conventions, we introduce the following expression:

$$MS_P^{RAW}(Z)=SI_P^{RAW}*KPEN_P(Z)*DG_P^{RAW}\qquad(\text{Eq. 3})$$

wherein: $SI_P^{RAW}$ describes the relative or normalized intensities of the wavelengths included in the broadband light of a CPS light source, as the wavelengths are distributed at each pixel P of a designated or standardized wavelength detector. $KPEN_P(Z)$ describes the relative or normalized transmission (or attenuation) of the wavelengths included in a set of measurement profile data input from a CPS pen to a CPS wavelength detector for a measuring distance Z, as the wavelengths are distributed at each pixel P of a designated or standardized wavelength detector. $KPEN_P(Z)$ may be thought of as a distance-dependent transfer function of the CPS pen for each wavelength (or its corresponding detector pixel). $DG_P^{RAW}$ describes the relative or normalized signal gain associated with each pixel of a wavelength detector. Thus, EQUATION 3 indicates approximately that for a given measuring distance Z, the raw wavelength detector signal $MS_P^{RAW}(Z)$ at each pixel P equals the raw intensity $SI_P^{RAW}$ input to CPS pen at the wavelengths that reach pixel P, times the distance-dependent transfer function of the CPS pen $KPEN_P(Z)$ for the wavelengths that reach pixel P for distance Z, times the signal gain $DG_P^{RAW}$ for pixel P.

To briefly explain a type of source+detector subsystem compensation taught in the '456 patent, FIG. 5 is a diagram of a graph 500 illustrating a raw intensity profile signal 520 for a CPS source+detector subsystem, which includes a long-range signal variation component 530 which may be attributed to the CPS light source, and other long range variation components of the CPS system throughput, such as detector wavelength sensitivity. It will be appreciated that the long-range signal variation component 530 is not actually detected individually by the wavelength detector 162, but may approximately correspond to a smoothed and/or standard shape for a source+detector intensity profile in some embodiments, and provides a convenient reference for the purposes of this disclosure. A representative ideal measurement profile signal data 510 corresponding to a measurement distance indicating coordinate 510-DIC, is also shown. The raw intensity profile signal 520 may be acquired by bypassing an optical pen, as taught in the '456 patent. For example, using one of the configurations outlined in the '456 patent, a fiber optic loop (e.g., corresponding to CONNECTOR-F in FIG. 1) is attached to input source light from a connector (e.g., corresponding to CONNECTOR-E in FIG. 1) and return it back through that connector to the source+detector subsystem 161. We may define the raw intensity profile signal 520 to be a set of signals $SDSS_P^{RAW}$ that characterize the source+detector subsystem 161, approximately as follows:

$$SDSS_P^{RAW}=SI_P^{RAW}*DG_P^{RAW}\qquad(\text{Eq. 4})$$

For future reference, we may substitute EQUATION 4 into EQUATION 3 and write:

$$MS_P^{RAW}(Z)=SDSS_P^{RAW}*KPEN_P(Z)\qquad(\text{Eq. 5})$$

The raw intensity profile signal 520. The source+detector variations reflected in the source+detector terms $SI_P^{RAW}$ and $DG_P^{RAW}$ and $SDSS_P^{RAW}$ in EQUATIONS 4 and 5 may lead to errors in determining distance indicating coordinates, as outlined below with reference to FIGS. 6A-6B.

Figure 6B:
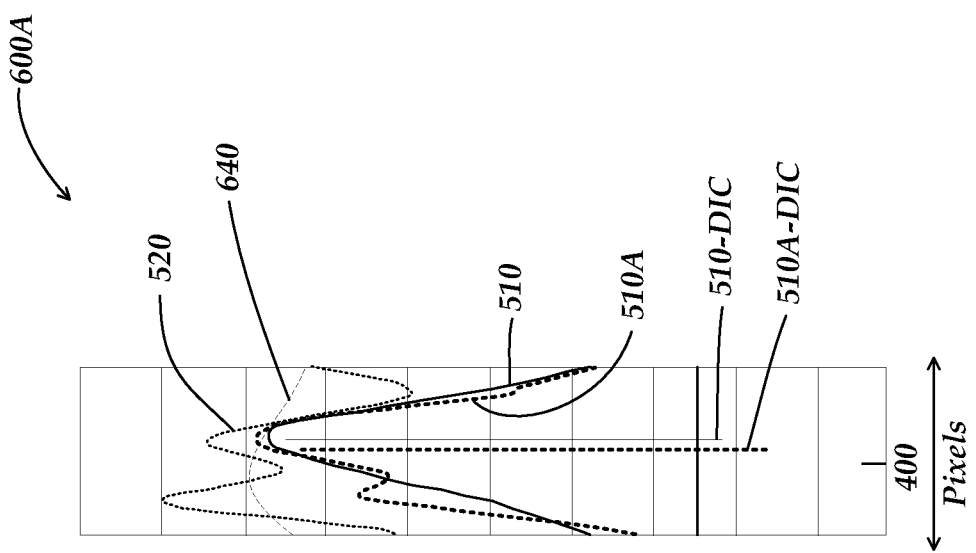
FIGS. 6A and 6B are diagrams of a selected portion of the graph of FIG. 5 illustrating the effects of short range raw intensity profile signal components on the distance indicating coordinate determined for a peak region signal corresponding to a measurement distance indicating coordinate.
Figure 6A:
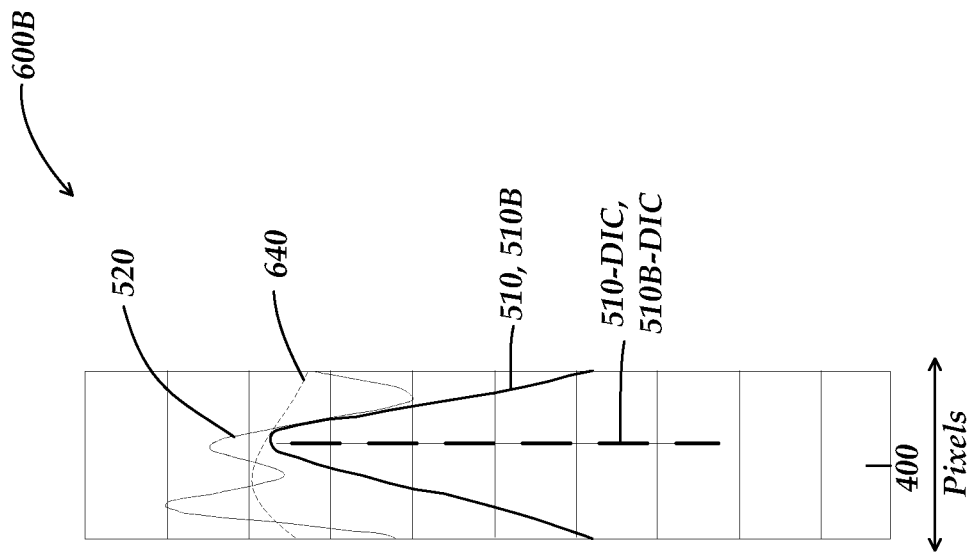

The ideal measurement profile signal data 510 corresponds to a reference or standardized intensity profile times the term $KPEN_P(Z)$. The term $KPEN_P(Z)$ shown in EQUATIONS 5 and 3, may be thought of as a distance-dependent transfer function of an optical pen (and/or the first optical path 120) for each wavelength (or its corresponding detector pixel), as previously indicated. It should be emphasized that the ideal measurement profile signal data 510 and the corresponding measurement distance indicating coordinate 510-DIC are not included in the signal 520. Rather, they are provided in FIG. 6 only to support an explanation of a segment 550 of the graph 500. The explanation based on the segment 550 is continued below with reference to FIGS. 6A and 6B FIGS. 6A and 6B are diagrams 600A and 600B, including the segment 550 of the graph of FIG. 5, including the raw intensity profile signal 520 for a CPS source+detector subsystem, the representative ideal measurement profile signal data 510 and its corresponding ideal distance indicating coordinate 510-DIC, as previously described. FIGS. 6A and 6B also include a reference profile signal 640 representing a standardized or reference set of profile signal data used for calibration, as taught in the '456 patent and outlined above (e.g., corresponding to an actual or compensated intensity profile signal used to establish the distance calibration data 410 shown in FIG. 4). In some embodiments, the reference profile signal 640 may be approximately the same as the signal variation component 530 shown in FIG. 5, or an actual profile (e.g., as represented in EQUATION 4) used for calibration. However, more generally, it may alternatively be an ideal or standardized profile (e.g., a flat profile). As previously indicated, the raw intensity profile signal 520 corresponds to a set of signals $SDSS_P^{RAW}$ that characterizes the source+detector subsystem 161, and the ideal measurement profile signal data 510 corresponds to a reference or standardized intensity profile times the term $KPEN_P(Z)$, which may be thought of as a distance-dependent transfer function of a CPS pen or the optical path 120, for the wavelength(s) at each detector pixel P.

EQUATION 5 describes a set of raw measurement profile signal data $MS_P^{RAW}(Z)$ that is the product of a raw or non-standardized intensity profile produced by a CPS source+detector subsystem 161 times the distance-dependent transfer function $KPEN_P(Z)$ of an optical pen or the first confocal optical path 120, for a workpiece surface at the distance Z from the optical pen or the first confocal optical path 120. This corresponds to the raw measurement profile signal data 510A in FIG. 6A. As shown in FIG. 6A, the wavelength-dependent variations in a particular source+detector subsystem 161 (as reflected in the signal 520), cause corresponding unique irregularities and asymmetry in the shape of the peak region of the raw measurement profile signal data 510A, distorting it in a unique manner relative to the peak region of the ideal measurement profile signal data 510 that corresponds to a reference or standardized intensity profile times the distance-dependent transfer function term $KPEN_P(Z)$ of an optical pen or the first confocal optical path 120. Of course, a distance indicating coordinate 510A-DIC determined for the uniquely distorted raw measurement profile signal data 510A will be source+detector subsystem specific, and will disagree with the distance indicating coordinate 510-DIC corresponding to the undistorted ideal measurement profile signal data 510. For example, note that a relatively small shift in the location of the measurement profile signal data 510 (e.g., a shift 20 pixels to the left in FIGS. 5, 6A, and 6B), which corresponds to a relatively small change in Z, would drastically change the shape of the raw measurement profile signal data 510A. The relative location of the resulting distance indicating coordinate would thus change rather erratically compared to the small change in Z. In much of the prior art, the peak region is unjustifiably assumed to be relatively narrow, and the significance of such shape distortions and asymmetries are therefore not adequately accounted for in CPS design or signal processing (e.g., a peak a few pixels wide is assumed to not exhibit significant distortion or asymmetry, and so on).

FIG. 6B illustrates the results of an improved signal processing method, according to teachings included in the '456 patent. In FIG. 6B, the variations of the signals $SDSS_P^{RAW}$ that characterize the source+detector subsystem 161 are removed or compensated relative to a reference profile (e.g., as represented by the reference profile signal 640) Using previously defined naming conventions, the reference profile signal 640 corresponds to a set of signals $SDSS_P^{REF}$, and the compensated measurement profile signal data 510B corresponds to a set of signals $MS_P^{COMP}(Z)$:

$$MS_P^{COMP}(Z)=SDSS_P^{REF}*KPEN_P(Z) \quad \text{(Eq. 6)}$$

As shown in FIG. 6B, the peak region of the compensated measurement profile signal data 510B, which corresponds to the set of signals $MS_P^{COMP}(Z)$, nominally matches the ideal measurement profile signal data 510 because the profile comprising the set of signals $SDSS_P^{REF}$ nominally matches the reference profile signal 640. The distance indicating coordinate 510B-DIC, corresponding to the compensated measurement profile signal data 510B, therefore more closely agrees with the distance indicating coordinate 510-DIC, corresponding to the ideal measurement profile signal data 510.

For future reference, we define a set of compensation factors $KCOMP_P$ that may be based on these signals:

$$KCOMP_P = \frac{SDSS_P^{REF}}{SDSS_P^{RAW}} \quad \text{(Eq. 7)}$$

That is, since the profile or set of signals $SDSS_P^{REF}$ are known because they are the reference set (e.g., as used for distance calibration), and the profile or set of raw signals $SDSS_P^{RAW}$ may be known because they may be measured as taught in the '456 patent and/or as disclosed herein, then a set of compensation factors $KCOMP_P$ may be determined that convert the raw measurement signal values $MS_P^{RAW}(Z)$ to compensated measurement signal values $MS_P^{COMP}(Z)$ in order to match distance calibration data (e.g., the distance calibration data 410, for example), as shown below.

Using the relationship of EQUATION 7, we may rewrite EQUATION 6 as:

$$MS_P^{COMP}(Z)=KCOMP_P*(SDSS_P^{RAW}*KPEN_P(Z)) \quad \text{(Eq. 8)}$$

Combining EQUATIONS 8 and 5:

$$MS_P^{COMP}(Z)=KCOMP_P*MS_P^{RAW}(Z) \quad \text{(Eq. 9)}$$

As previously indicated, the present invention is aimed toward providing spectral profile data usable to compensate for material spectral reflectivity variations "on the fly" (that is, simultaneously or nearly simultaneously with corresponding CPS measurement data). The '456 patent and/or the foregoing equations do not consider errors due to material spectral reflectivity variations. The source of such errors may be understood with reference to FIG. 7.

Figure 7:
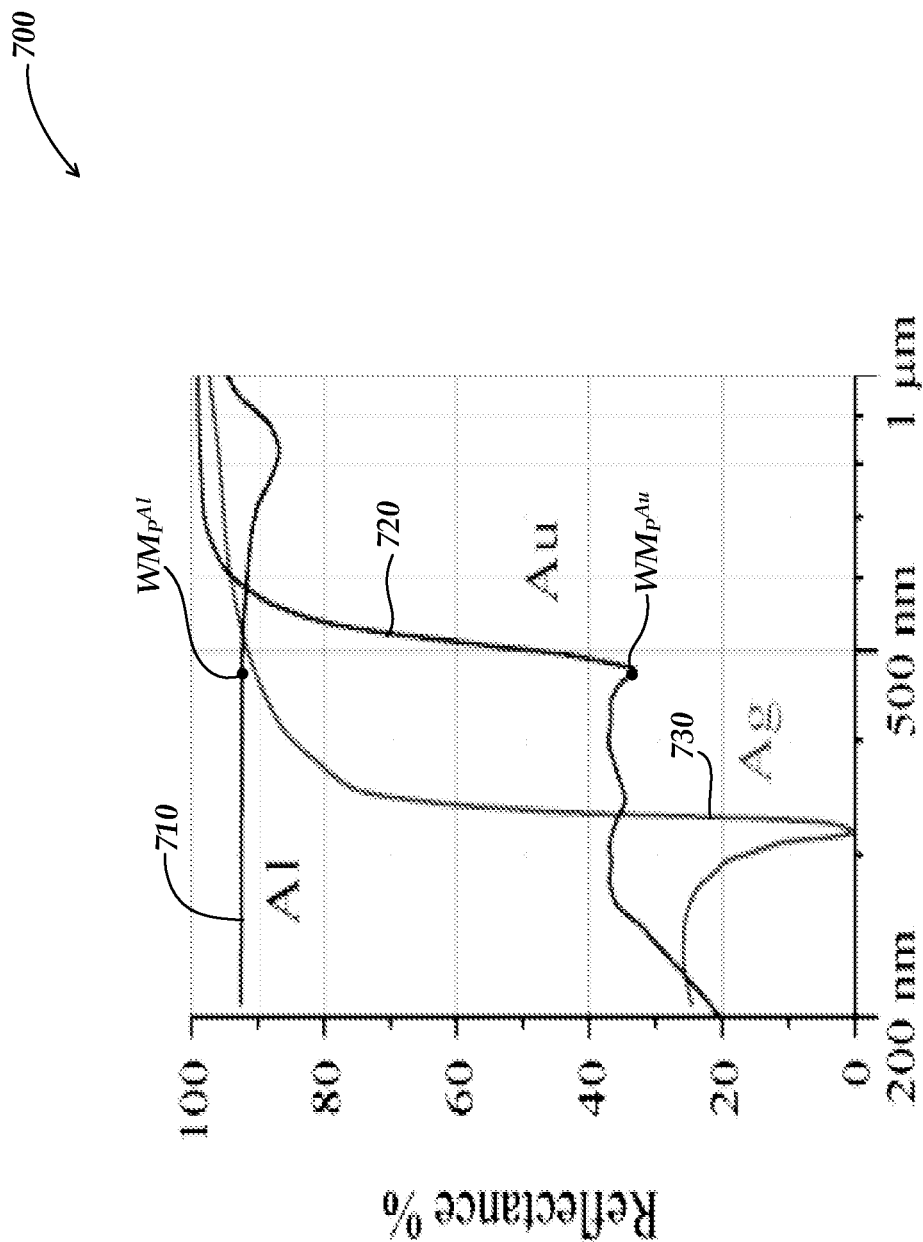
FIG. 7 is a diagram of a graph illustrating the spectral reflectivity of different types of workpiece materials.

FIG. 7 is a diagram of a graph 700 illustrating the spectral reflectivity of different types of workpiece materials, which may vary significantly at some wavelengths, depending on the material composition, angle of incidence, and surface properties. FIG. 7 shows an aluminum mirror spectral reflectivity curve 710, a gold minor spectral reflectivity curve 720, and a silver minor spectral reflectivity curve 730. All of the spectral reflectivity curves are measured at normal angles of incidence. As shown, the reflectivity of the materials is wavelength dependent. As a specific example, the reflectivity of gold changes from 60% to 95% as the wavelength changes from 500 nm to 600 nm, which is generally within the sensing range of a CPS wavelength detector. It will be appreciated that such factors may be particularly relevant in certain applications (e.g., gold is widely used in the electronics and/or semiconductor industry where precision measurements are required). It should also be noted that the aluminum mirror spectral reflectivity curve 710 is relatively flat, which in certain embodiments makes it suitable for calibration operations. Other types of surface materials may have more complex and unpredictable spectral reflectivities (e.g., painted surfaces, thin films, dielectric materials, plastics, etc.).

The disclosure of the '456 patent does not mention errors due to material spectral reflectivity variations, nor does it disclose a configuration that can be used to compensate for such errors. In order to describe and account for such errors, we may modify various equations from above. In particular, we may understand EQUATION 4, to represent distance-independent profile or spectrum shape determinants or components (e.g., the profile component due to the light source spectrum represented by the term $SI_P^{RAW}$, and the profile component due to the detector gain represented by the term $DG_P^{RAW}$, in EQUATION 4). That is, in contrast to the distance-dependent profile component term $KPEN_P(Z)$ which is determined or contributed by an optical pen or the first confocal optical path 120, the terms of EQUATION 4 do not depend on the measurement distance to the workpiece. Material spectral reflectivity variations may be regarded as another distance-independent profile component or spectrum shape determinant. Therefore, we may modify EQUATION 4 to account for material spectral reflectivity variations of a workpiece surface (and/or a calibration surface), as follows:

$$SDSS(MAT)_P^{RAW} = SI_P^{RAW} * DG_P^{RAW} * MWF(MAT)_P \quad \text{(Eq. 10)}$$

where the signals $SDSS(MAT)_P^{RAW}$ characterize the distance-independent raw intensity profile associated with a source+detector subsystem 161 used in combination with a particular workpiece surface (or calibration surface) compromising a material MAT (e.g., aluminum, gold, etc.). The material wavelength factors $MWF(MAT)_P$ will be understood to be factors (e.g., normalized factors) that characterize the relative reflectivity of the material (e.g., as shown in FIG. 7) at wavelengths corresponding to the detector pixels P. Based on the explanation above, it will be understood that the corresponding modification of EQUATION 5 to indicate workpiece surface material effects is:

$$MS(MAT)_P^{RAW}(Z) = SDSS(MAT)_P^{RAW} * KPEN_P(Z) \quad \text{(Eq. 11)}$$

and the corresponding modification of EQUATION 7 to indicate workpiece surface material effects is:

$$KCOMP(MAT)_P = \frac{SDSS_P^{REF}}{SDSS(MAT)_P^{RAW}} \quad \text{(Eq. 12)}$$

Using the relationship of EQUATION 12, we may rewrite EQUATION 6 as:

$$MS_P^{COMP}(Z) = KCOMP(MAT)_P * [SDSS(MAT)_P^{RAW} * KPEN_P(Z)] \quad \text{(Eq. 13)}$$

Combining EQUATIONS 11 and 13:

$$MS_P^{COMP}(Z) = KCOMP(MAT)_P * MS(MAT)_P^{RAW}(Z) \quad \text{(Eq. 14)}$$

By analogy to the previous discussion of EQUATIONS 8 and 9, a set of workpiece material-specific compensation factors $KCOMP(MAT)_P$ may be determined that convert the raw measurement signal values $MS(MAT)_P^{RAW}(Z)$ that arise from a specific workpiece material to compensated measurement signal values $MS_P^{COMP}(Z)$, in order to match distance calibration data (e.g., the distance calibration data 410, for example).

The '456 patent teaches a "bypass" method for characterizing and/or compensating the source+detector terms $SI_P^{RAW}$ and $DG_P^{RAW}$ described with reference to EQUATIONS 4 and 10, but does not address the material-specific term $MWF(MAT)_P$ included in EQUATION 10 or the associated material-specific effects reflected in EQUATIONS 11-14. Material reflectivity characteristics and related errors are ignored in the '456 patent, and the "bypass" methods of calibration and/or compensation that bypass the optical pen, as taught in the '456 patent, also bypass the workpiece surface. As such, the '456 patent offers no method of gathering material reflectivity data related to a workpiece surface, nor for recognizing or correcting related errors.

According to the principles of this disclosure, the second optical path 130 described above with reference to FIG. 1 can be used to gather material reflectivity data related to a workpiece surface. In particular, since the second optical path 130 is chromatically non-dispersive, it can provide the distance-independent signals $SDSS(MAT)_P^{RAW}$ discussed with reference to EQUATION 10, which may characterize the distance-independent raw intensity profile associated with a source+detector subsystem 161 used in combination with a particular workpiece surface. Since the profile or set of signals $SDSS_P^{REF}$ are known because they are the reference set (e.g., as used for distance calibration), and the profile or set of raw signals $SDSS(MAT)_P^{RAW}$ may be known because they may be measured by a chromatically non-dispersive optical path as disclosed herein, then a set of compensation factors $KCOMP(MAT)_P$ may be determined (e.g., according to the relationship shown in EQUATION 12) that converts the raw measurement signal values from a particular workpiece surface material $MS(MAT)_P^{RAW}(Z)$ to compensated measurement signal values $MS_P^{COMP}(Z)$ (e.g., according to the relationship shown in EQUATION 14), in order to match distance calibration data, as disclosed herein.

It will be appreciated that since the use of a chromatically non-dispersive optical path as disclosed herein may characterize the combination of terms shown in EQUATION 10, it may characterize the source+detector characteristics in combination with the workpiece surface material characteristics, and may replace or eliminate the need for the bypass methods of the '456 patent in some embodiments. Alternatively, it will be appreciated that use of the bypass methods of the '456 patent (e.g., the use of the bypass CONNECTOR-F discussed with reference to FIG. 1, or the like, connected to a source+detector) may isolate the source+detector terms $SI_P^{RAW}$ and $DG_P^{RAW}$ shown in EQUATIONS 4 and 10, and thereby allow the term material-specific term $MWF(MAT)_P$ included in EQUATION 10 to be determined individually based on comparison of bypass signals and non-bypass signals. In some embodiments, a first light source may be connected to input a first input spectral profile of wavelengths to the first confocal optical path and a second light source may be connected to input a second input spectral profile of wavelengths to the second optical path, and the alternative outlined above may be used such that the second optical path may provide data that is usable to isolate the material-specific term $MWF(MAT)_P$ and compensate the first output spectral profile data for potential measurement distance errors comprising errors associated with the workpiece material component. Of course, it is also possible to use the procedures outlined above to characterize the calibration mirror material effects separately from the source+detector effects present during distance calibration, if desired.

Based on the disclosure above, it will be appreciated that there are various ways to characterize the individual terms of EQUATION 10 and/or to characterize the reference profile or set of signals $SDSS_P^{REF}$, and the various distance-independent profile components or shape contributions may be determined and compensated individually in some embodiments, in combination in some embodiments, or sequentially in other embodiments, according to the teachings of this disclosure. It will be appreciated that the foregoing equations are illustrative of one way of using the signals gathered using a chromatically non-dispersive optical path according to this invention, and are not limiting.

Figure 8:
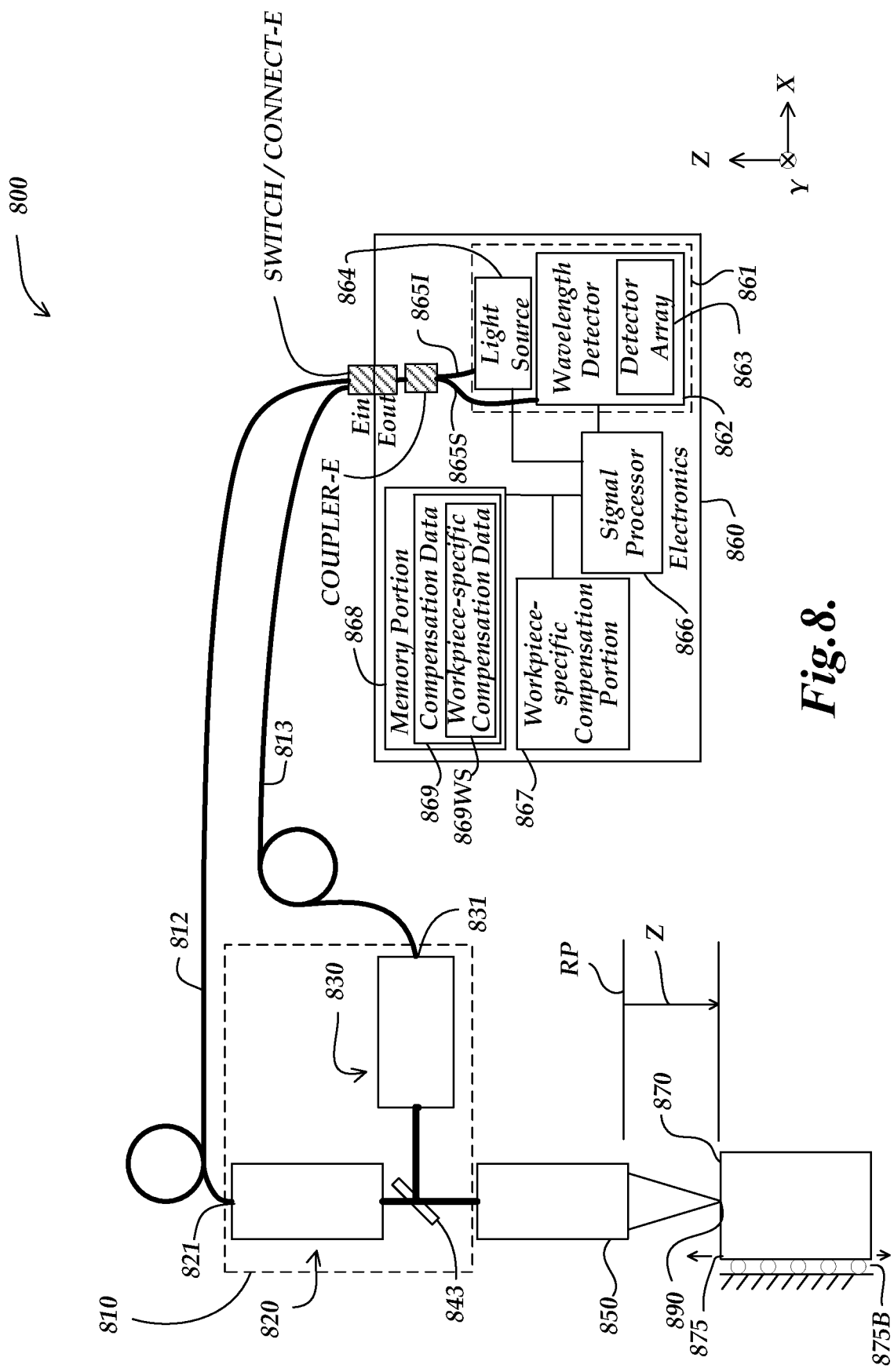
FIG. 8 is a block diagram of a second exemplary embodiment of a chromatic point sensor (CPS) system including first and second optical paths in accordance with the invention.

FIG. 8 is a block diagram of a second exemplary embodiment of a chromatic point sensor 800. The chromatic point sensor 800 is similar to the chromatic point sensor 800 shown in FIG. 1. It should be appreciated that similarly numbered elements 8XX are similar or identical to elements 1XX of FIG. 1, and only those aspects of the embodiment which are significantly different from FIG. 1 are outlined with respect to FIG. 8. In the embodiment shown in FIG. 8, the chromatic point sensor 800 comprises a coupler COUPLER-E, which connects to the connector SWITCH/CONNECT-E, thereby connecting optical fiber cables 812 and 813 to the CPS electronics 160. It should be appreciated that the connector SWITCH/CONNECT-E is a switching element which comprises a fiber switcher (e.g., an electro-optic switcher, in one embodiment) which is configured to connect the input spectral profile (and the wavelength detector 162) to the first confocal optical path 820 at a first time and to connect the input spectral profile (and the wavelength detector 162) to the second optical path 830 at a second time. It will be appreciated that the connector SWITCH/CONNECT-E may operate as a first and/or second optical path disabling element that is sensed and/or controlled by the CPS electronics 160 such that the appropriate signal processing is synchronized with the presence of the first and second output spectral profile. Thus, the switching element 141 shown in FIG. 1 is functionally replaced by the connector SWITCH/CONNECT-E in this embodiment. More generally, it should be appreciated that the first confocal optical path disabling element and the second optical path disabling element may be provided by separate elements (e.g., shutters) that are operated to provide one operational confocal path at a time, or they may be merged and/or indistinguishable (e.g., a single aperture on a rotating disk, or a shared deflector, or the like).

FIG. 9 is a block diagram of a third exemplary embodiment of a chromatic point sensor 900. The chromatic point sensor 900 is similar to the chromatic point sensor 800 shown in FIG. 8. It should be appreciated that similarly numbered elements 9XX are similar or identical to elements 8XX of FIG. 8 and only those aspects of the embodiment which are significantly different from FIG. 8 are outlined with respect to FIG. 9.

In the embodiment shown in FIG. 9, the chromatic point sensor 900 is integrated with a machine vision inspection system 990 including a machine vision host controller 991. More specifically, a dual path optical portion 910 is integrated with the machine vision inspection system 990 such that the first confocal optical path 920 and the second optical path 930 each include a shared objective lens 950 which is part of the imaging path optics of the machine vision inspection system 990. The first confocal optical path 920 and the second optical path 930 additionally comprise a shared beamsplitter 945 and shared beamsplitter 947. The machine vision inspection system 990 also comprises a camera 951 which is configured to image a workpiece 970 along an optical path that shares the objective lens 950 used by the first confocal optical path 920 and the second optical path 930, and a lens turret system 953 which is configured to select lenses according to desired levels of magnification or other optical characteristics used for imaging. The machine vision inspection system 990 also comprises a beamsplitter 943 which is configured such that a portion of the optical paths of the first confocal optical path 120, the second optical path 130, and the imaging path of the machine vision inspection system are collinear. A typical path length from the shared objective lens 950 to either a non-dispersive optical element 923 or a dispersive optical element 933 may be on the order of approximately 300 cm. In some embodiments, the light from the dispersive optical element 933 to the objective lens 950 will vary from collimation, depending on its wavelength, and the light from the non-dispersive optical element 933 to the objective lens 950 may be approximately collimated for all wavelengths. It should be appreciated that the position of the shared beamsplitters 945 and 947 may be adjusted or additional beamsplitters may be added to place the first confocal optical path 920 and the second optical path 930 in desired positions relative to the components of the machine vision inspection system 990.

When integrated with the machine vision inspection system 990 including the machine vision host controller 991, the configuration of the CPS electronics 960 may differ from the CPS electronics 160 shown in FIG. 1. For example, as shown in FIG. 9, workpiece specific compensation portion 967' and a memory portion 968' which is configured to store compensation data 969' including workpiece specific compensation data 969WS' may be provided in the machine vision host controller 991 which may exchange data with the CPS electronics 960 as needed, according to known techniques. In some embodiments, the machine vision host controller 991 may also comprise a general purpose computer and control software for operating the machine vision inspection system 990, as well as software routines that interact with the CPS electronics 960. Various alternative configurations will be apparent to one of ordinary skill in the art based on this disclosure. In various embodiments, the second optical path (e.g., the second optical path 130, 830, or 930) may be configured as a confocal optical path, wherein a confocal aperture (e.g., 131, 831, or 930) is provided at the connection point of the associated optical fiber (e.g., the fiber 113, 813, or 913). This may be the most economical and effective configuration in many cases. However, more generally, the second optical path need not be confocal. For example, if the optical fiber and/or aperture (e.g., the end of the optical fiber) associated with the second optical path is large enough to admit sufficient signal light reflected from the material surface through the second optical path, then the second optical path need not be confocal. However, in such embodiments it may still be advantageous if the second optical path is configured to focus different wavelengths at substantially the same distance proximate to the workpiece, such that a specific representative portion of a material surface can be isolated by the resulting illumination spot.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A chromatic point sensor (CPS) system configured to compensate for potential errors, including errors due to workpiece material effects, the CPS system comprising:

a first confocal optical path including a longitudinally dispersive element, the first confocal optical path configured to focus different wavelengths at different distances proximate to a workpiece;

a second optical path configured to focus different wavelengths at substantially the same distance proximate to the workpiece;

a light source connected to input a first input spectral profile of wavelengths to the first confocal optical path;

a light source connected to input a second input spectral profile of wavelengths to the second optical path;

a first confocal optical path disabling element configured to prevent the first input spectral profile from being transmitted to a workpiece through the first confocal optical path;

a second optical path disabling element configured to prevent the second input spectral profile from being transmitted to a workpiece through the second optical path; and a CPS electronics comprising a CPS wavelength detector comprising a plurality of pixels distributed along a measurement axis of the CPS wavelength detector, the plurality of pixels receiving respective wavelengths and providing output spectral profile data, wherein, the CPS system is configured such that:

when the first confocal path blocking element is not activated, the first input spectral profile is connected to the first confocal optical path, the first confocal optical path outputs corresponding radiation to the workpiece surface and receives first path reflected radiation from the workpiece surface, the first path reflected radiation having a first output spectral profile comprising a distance-dependent profile component having a peak that indicates a measurement distance from the first confocal optical path to the workpiece and a distance-independent profile component that includes a workpiece material component, and the CPS electronics provides corresponding first output spectral profile data; and when the second path blocking element is not activated, the second input spectral profile is connected to the second optical path, the second optical path outputs corresponding radiation to the workpiece surface and receives second path reflected radiation from the workpiece surface, the second path reflected radiation having a second output spectral profile comprising a distance-independent profile component that includes the workpiece material component, and the CPS electronics provides corresponding second output spectral profile data that is usable to compensate the first output spectral profile data for potential measurement distance errors comprising errors associated with the workpiece material component.

2. The CPS system of claim 1, wherein the first confocal optical path and the second optical path are configured to output the first source radiation and the second source radiation to the same portion of the workpiece.

3. The CPS system of claim 1, wherein the first optical path and the second optical path each include a shared objective lens.

4. The CPS system of claim 1, wherein the CPS system is integrated into a machine vision inspection system and the first optical path and the second optical path each include a shared objective lens which is part of the machine vision inspection system.

5. The CPS system of claim 4, wherein the machine vision inspection system is configured to image the workpiece surface through the shared objective lens.

6. The CPS system of claim 1, wherein the light source connected to input a first input spectral profile of wavelengths to the first confocal optical path and the light source connected to input a second input spectral profile of wavelengths to the second optical path are the same light source, such that the first and second input spectral profiles are the same spectral profile.

7. The CPS system of claim 1, wherein the light source connected to input a first input spectral profile of wavelengths to the first confocal optical path and the light source connected to input a second input spectral profile of wavelengths to the second optical path are different light sources.

8. The CPS system of claim 1, wherein the first confocal optical path disabling element and the second optical path disabling element are the same element.

9. The CPS system of claim 1, wherein the first confocal optical path disabling element and the second optical path disabling element are provided by a switching element which comprises one of (a) a shutter wheel, and (b) a fiber switcher.

10. The CPS system of claim 1, wherein the CPS electronics further comprises a signal processor which determines workpiece-specific spectral profile compensation data based on the second output spectral data to compensate the first output spectral profile data for potential measurement distance errors comprising errors associated with the workpiece material component.

11. The CPS system of claim 1, wherein the distance-independent profile component includes a light source spectrum profile component associated with the light source and the second output spectral profile is used to compensate errors associated with the light source spectrum profile component.

12. The CPS system of claim 1, wherein the different distances where the first confocal optical path focuses different wavelengths define a measurement range and the distance where the second optical path focuses different wavelengths is within the measurement range.

13. The CPS system of claim 1, wherein the first confocal optical path and the second optical path comprise a common path shared beamsplitter.

14. The CPS system of claim 13, wherein the first confocal optical path and the second optical path are collinear between the shared beamsplitter and the workpiece surface.

15. The CPS system of claim 13, wherein one of the first confocal optical path and the second optical path comprises a reflector.

16. The CPS system of claim 1, wherein the second optical path comprises an achromat.

17. The CPS system of claim 1, wherein the CPS electronics comprises a compensation portion, the second optical path is used to acquire the second output spectral profile from a representative portion of the workpiece surface, the compensation portion receives the second output spectral profile, the first optical path is used to acquire the first output spectral profile from a measurement portion of the workpiece surface which is different from the representative portion and the compensation portion is used to compensate the first output spectral profile data for potential measurement distance errors comprising errors associated with the workpiece material component.

18. The CPS system of claim 1, wherein the second optical path is a confocal optical path.

* * * * *